United States Patent
Park et al.

(10) Patent No.: US 7,382,090 B2
(45) Date of Patent: Jun. 3, 2008

(54) FIELD EMISSION DEVICE AND FIELD EMISSION DISPLAY USING THE SAME

(75) Inventors: Young-Jun Park, Suwon-si (KR); Yong-Wan Jin, Seoul (KR); In-Taek Han, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 330 days.

(21) Appl. No.: 11/130,264

(22) Filed: May 17, 2005

(65) Prior Publication Data

US 2005/0258739 A1    Nov. 24, 2005

(30) Foreign Application Priority Data

May 22, 2004   (KR) ...................... 10-2004-0036669

(51) Int. Cl.
*H01J 17/30* (2006.01)
(52) U.S. Cl. ...................... 313/497; 313/495
(58) Field of Classification Search ...................... None
See application file for complete search history.

(56) References Cited

U.S. PATENT DOCUMENTS

| | | | |
|---|---|---|---|
| 5,920,151 A | 7/1999 | Barton et al. | |
| 6,224,447 B1 * | 5/2001 | Moradi et al. | 445/24 |
| 6,972,513 B2 * | 12/2005 | Shiratori et al. | 313/309 |
| 2003/0141798 A1 * | 7/2003 | Jin et al. | 313/310 |
| 2004/0251841 A1 * | 12/2004 | Negishi et al. | 315/169.3 |

FOREIGN PATENT DOCUMENTS

WO    WO 02/07180 A1    1/2002

OTHER PUBLICATIONS

A Review of Microelectronic Film Deposition Using Direct and Remote Electron-Beam-Generated Plasmas: Yu, Luo, Sheng, Zarnani, Lin, Collins, Plasma Science, IEEE Transactions on; vol. 18 Issue 5, Oct. 1990 pp. 753-765.*
Carbon nanotube technology for solid state and vacuum electronics; Teo, Lacerda, Yang, Teh, Robinson, Dalal, Rupesinghe, Chhowalla, Lee, Jefferson, Hasko, Amaratunga, Milne, Legagneux; Gangloff, Minoux, Schnell, Pribat; Circuits, Devices and Systems, IEE Proceedings, vol. 151 Issue 5, Oct. 15, 2004; pp. 443-451.*

* cited by examiner

*Primary Examiner*—Vip Patel
(74) *Attorney, Agent, or Firm*—Robert E. Bushnell, Esq.

(57) ABSTRACT

A field emission device and a field emission display (FED) using the same and a method of making the field emission device. The FED includes a glass substrate, a layer of a material formed on the glass substrate and having a concave portion, a cathode electrode formed on the material layer and also having a concave portion, electron emitters formed on the concave portion of the cathode electrode, a gate insulating layer formed on the cathode electrode and having a cavity communicating with the concave portion, and a gate electrode formed on the gate insulating layer and having a gate aperture aligned with the cavity.

16 Claims, 13 Drawing Sheets

FIELD EMISSION DEVICE AND FIELD EMISSION DISPLAY USING THE SAME

CLAIM OF PRIORITY

This application makes reference to, incorporates the same herein, and claims all benefits accruing under 35 U.S.C. §119 from an application for FIELD EMISSION DEVICE AND FIELD EMISSION DISPLAY USING THE SAME earlier filed in the Korean Intellectual Property Office on May 22, 2004 and there duly assigned Ser. No. 10-2004-0036669.

BACKGROUND OF THE INVENTION

1. Field of the Invention

The present invention relates to a novel design for a field emission device and a field emission display (FED) using the novel field emission device and a method of making the novel field emission device, the novel field emission device having improved focusing properties of an electron beam.

2. Description of the Related Art

Displays play an important role in information and media delivery and are widely used in personal computer monitors and television sets. Displays are usually either cathode ray tubes (CRTs), which use high speed thermal electron emission, and flat panel displays, which are rapidly developing. Types of flat panel displays include plasma display panels (PDPs), field emission displays (FEDs), liquid crystal displays (LCD) and others.

In FEDs, when a strong electric field is applied between a gate electrode and field emitters arranged at a predetermined distance on a cathode electrode, electrons are emitted from the field emitters and collide with fluorescent materials on the anode electrode, thus emitting visible light. FEDs are thin displays, at most several centimeters thick, having a wide viewing angle, low power consumption, and low production cost. Thus, FEDs together with PDPs attract attention as the next generation of displays.

FEDs have a similar physical operation principle to CRTs. That is, electrons are emitted from a cathode electrode and are accelerated toward and collide with an anode electrode. At the anode electrode, the electrons excite fluorescent material coated on the anode electrode to emit visible light. FEDs are different from CRTs in that the electron emitters are formed of cold cathode material. However, a problem with FEDs is limitations in the ability to focus the electron beam so that the each electron beam lands at a desired location on the fluorescent material to achieve good image quality.

To overcome this problem, U.S. Pat. No. 5,920,151 to Barton et al discloses a FED having an imbedded focusing structure. However, the focusing gate electrode in Barton '151 is formed on an organic material called polyimide, which requires an outgassing process for discharging volatilized gas. Thus, such a FED cannot be applied to large displays. Therefore, what is needed is a design for an FED that provides improved electron focus and that can be applied to make large displays.

SUMMARY OF THE INVENTION

It is therefore an object of the present invention to provide a design for a field emission device and an FED using the novel field emission device that results in a tightly focused electron beam.

It is also an object to provide a design for a field emission device and an FED using the field emission device that can be applied to large displays.

It is further an object of the present invention to provide a method for making the novel field emission device and a novel method of making the FED using the novel field emission device that is simple to manufacture.

These and other objects can be achieved by a field emission device that includes a glass substrate, a material layer formed on the glass substrate and having a concave portion, a cathode electrode formed on the material layer resulting in a cathode electrode having a concave shape, electron emitters formed on the concave portion of the cathode electrode, a gate insulating layer formed on the cathode electrode and having a cavity communicating with the concave portion of the cathode electrode, and a gate electrode formed on the gate insulating layer and having a gate aperture aligned with the cavity.

The cavity can have a shape of a semicircle or a hemisphere. The material layer can be made of electrically insulating material or made of a metal, such as the material used to make the cathode electrode. An amorphous silicon layer having a aperture corresponding to the concave portion of the cathode electrode can be sandwiched in between the cathode electrode and the gate insulating layer. Being transparent to visible light but opaque to ultraviolet light, the amorphous silicon layer can also serve as a photolighographic mask when UV sensitive material is to be patterned. The electron emitters can be carbon nanotube (CNT) emitters.

According to another embodiment of the present invention, there is provided a field emission device that includes a glass substrate, a material layer formed on the glass substrate and having a concave portion, a cathode electrode formed on the material layer, the cathode electrode also having a concave portion, electron emitters formed on the concave portion of the cathode electrode, a lower gate insulating layer formed on the cathode electrode and having a cavity communicating with the concave portion of the cathode electrode, a lower gate electrode formed on the lower gate insulating layer and having a lower gate aperture aligned with the cavity, a focusing gate insulating layer formed on the lower gate electrode and having a aperture communicating with the cavity, and a focusing gate electrode formed on the focusing gate insulating layer and having a focusing gate aperture aligned with the cavity.

According to still another embodiment of the present invention, there is provided a field emission display (FED) that includes a rear substrate, a material layer formed on the rear substrate and having a concave portion, a cathode electrode formed on the material layer, the cathode electrode having a concave portion, electron emitters formed on the concave portion of the cathode electrode, a gate insulating layer formed on the cathode electrode and having a cavity communicating with the concave portion of the cathode electrode, a gate electrode formed on the gate insulating layer and having a gate aperture aligned with the cavity, a front substrate spaced apart from the rear substrate by a predetermined distance, an anode electrode formed on a side of the front substrate facing the electron emitters, and a fluorescent layer coated on the anode electrode.

According to yet another embodiment of the present invention, there is provided a field emission display that includes a rear substrate, a material layer formed on the rear substrate and having a concave portion, a cathode electrode formed on the material layer, the cathode electrode having a concave portion, electron emitters formed on the concave portion of the cathode electrode, a lower gate insulating layer formed on the cathode electrode and having a cavity communicating with the concave portion of the cathode electrode, a lower gate electrode formed on the lower gate insulating layer and having a lower gate aperture aligned with the cavity, a focusing gate insulating layer formed on the lower gate electrode and having a aperture communicating with the cavity, a focusing gate electrode formed on the focusing gate insulating layer and having a focusing gate aperture aligned with the cavity, a front substrate spaced apart from the rear substrate by a predetermined distance, an anode electrode formed on a side of the front substrate facing the electron emitters, and a fluorescent layer coated on the anode electrode facing the electron emitters.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
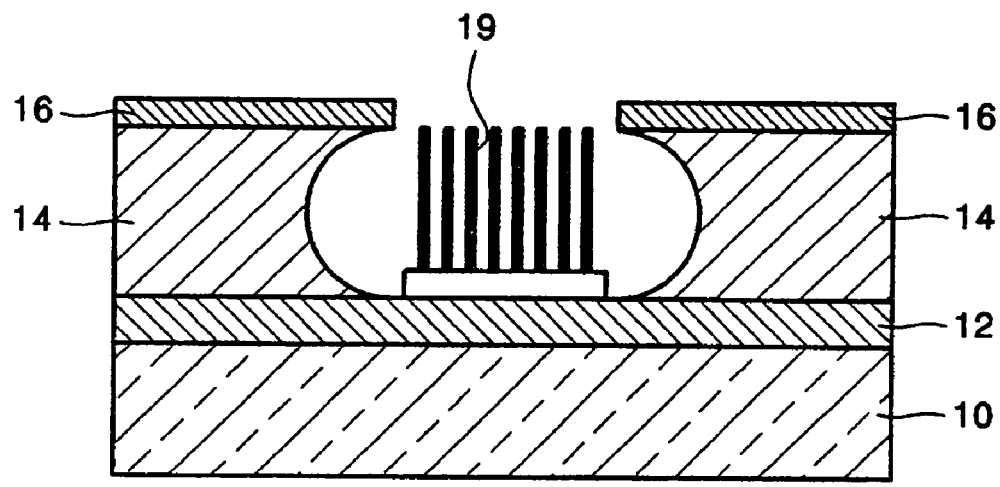
FIG. 1 is a schematic cross-sectional view illustrating the structure of a field emission device.
Figure 2:
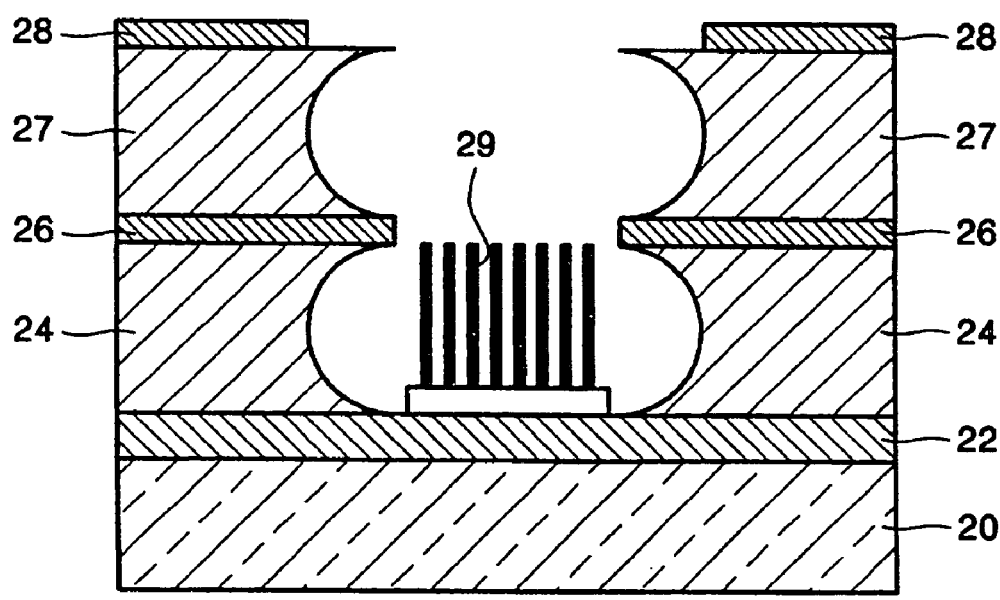
FIG. 2 is a schematic cross-sectional view illustrating the structure of another field emission device that has a focusing gate electrode.

Turning now to the figures, FIGS. 1 and 2 illustrate the structures of field emission devices 11 and 21 respectively. Referring to FIG. 1, the field emission device 11 has a structure in which a cathode electrode 12 is formed on a bottom substrate 10, and a gate electrode 16 for extracting electrons is formed on an insulating layer 14 above the cathode electrode 12. Electron emitters 19 are placed within a hole (or aperture) through which a portion of the cathode electrode 12 is exposed. Opposite the bottom substrate 10 is an anode with fluorescent material on it. Electrons emanating from the electron emitter 19 arrive on the anode to excite the fluorescent layer to thus form visible images for display.

In the field emission device 11 of FIG. 1, if the trajectories of electron beams are not controlled, the desired portion of the fluorescent layer cannot be excited, and thus the desired colors cannot be displayed. Therefore, there is a need for a technique to control the trajectories of the electron beams, to allow the electrons emitted from the electron emitters 19 to be correctly transferred to the desired portion of the fluorescent material coated on the anode electrode.

Turning now to FIG. 2, FIG. 2 is a view illustrating an field emission device 21 having a focusing gate electrode 28 that controls the trajectories of electron beams. Referring to FIG. 2, a second insulating layer 27 is deposited on a lower gate electrode 26, and a focusing gate electrode 28 for controlling the trajectories of electron beams is formed on the second insulating layer 27. Reference numerals 20, 22, 24, and 29 represent a substrate, a cathode electrode, a first insulating layer, and electron emitters, respectively.

Figure 3:
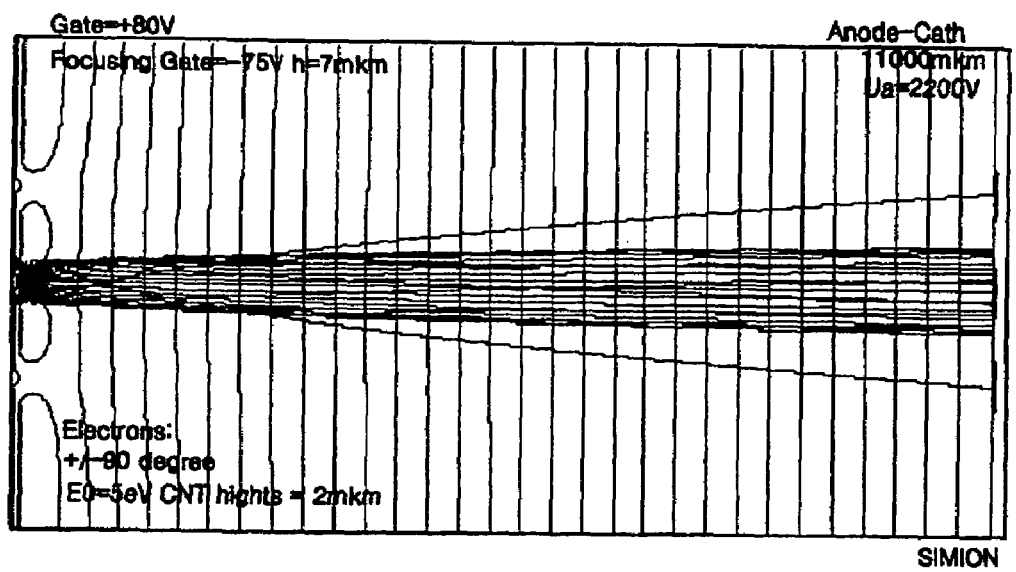
FIG. 3 is a simulation of the trajectories of electron beams emitted from electron emitters of the field emission device of FIG. 2.

Turning now to FIG. 3, FIG. 3 is a simulation of the trajectories of the electron beams emitted from the electron emitters of the field emission device 21 having the focusing gate electrode 28 as illustrated in FIG. 2. Referring to FIG. 3, overfocused electrons deviate from the intended region of the fluorescent layer and excite other regions of the fluorescent layer, reducing color purity.

Figure 4:
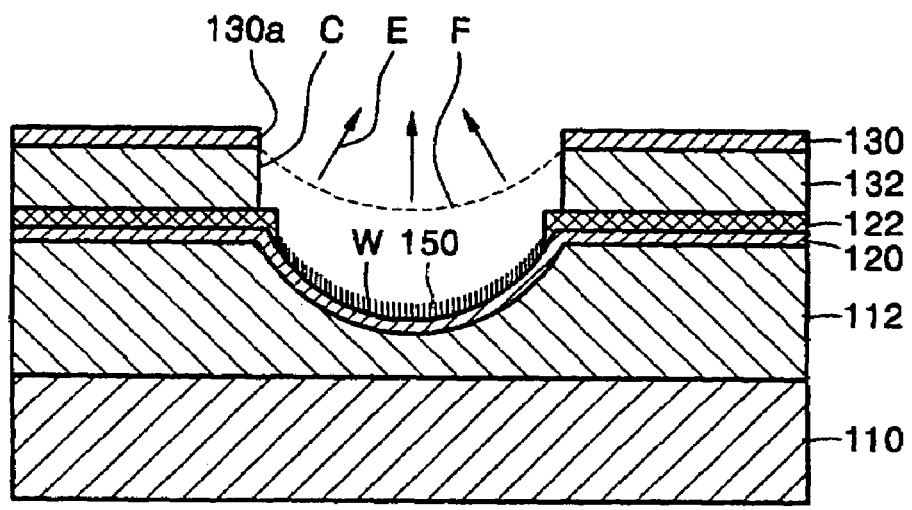
FIG. 4 is a schematic cross-sectional view illustrating a field emission device according to a first embodiment of the present invention.

Turning now to FIG. 4, FIG. 4 is a schematic cross-sectional view illustrating a field emission device 100 according to a first embodiment of the present invention. Referring to FIG. 4, an insulating layer 112 having a concave portion W and a cathode electrode 120 are sequentially formed on a glass substrate 110. In FIG. 4, the concave portion W is illustrated as being hemispherical but the present invention is in no way limited to this.

The insulating layer 112, such as a silicon oxide layer, is formed to generate the concave portion W for the cathode electrode 120. Alternatively, the cathode electrode 120 having a concave portion can be directly formed on the glass substrate 110, without using the insulating layer 112. The insulating layer 112 can have a thickness of 2 to 10 μm.

The cathode electrode 120 can be an ITO (indium tin oxide) transparent electrode. An amorphous silicon layer 122 is formed on the cathode electrode 120 on portions of the cathode electrode 120 not including concave portion of the cathode electrode. The amorphous silicon layer 122 ensures a uniform current flow through the cathode electrode 120. In addition, the amorphous silicon layer 122 has specific optical properties that allow visible light to pass but blocks UV light. The amorphous silicon layer 122 functions as a mask for a back exposure to UV light, as described below. CNT (carbon nano tube) emitters 150 as electron emitters are formed on the concave portion W of cathode 120.

A gate insulating layer 132 and a gate electrode 130 are sequentially layered on the amorphous silicon layer 122. The gate insulating layer 132 has a cavity C (or aperture) of a predetermined diameter. The gate electrode 130 has a gate aperture 130a corresponding to the cavity C.

The gate insulating layer 132 is a layer for maintaining electrical insulation between the gate electrode 130 and the cathode electrode 120. The gate insulating layer 132 is made of an insulating material, such as silicon oxide ($SiO_2$), and generally has a thickness of at least 1 μm.

The gate electrode 130 can be made of chromium with a thickness of about 0.25 μm. The gate electrode 130 extracts electron beams from the CNT emitters 150. A predetermined gate voltage, for example 80 V, can be applied to the gate electrode 130.

In FIG. 4, reference E represents the electron beams emitted from the CNT emitters 150 when voltages are applied to the gate electrode 130 and to the cathode electrode 120. Reference F represents an equipotential surface in the electric field generated by the cathode electrode 120 having a curved surface. The electron beams E emitted from the CNT emitters 150 proceed perpendicularly to the equipotential surface F in the electric field, thus allowing the focusing of the emitted electrons.

Figure 5:
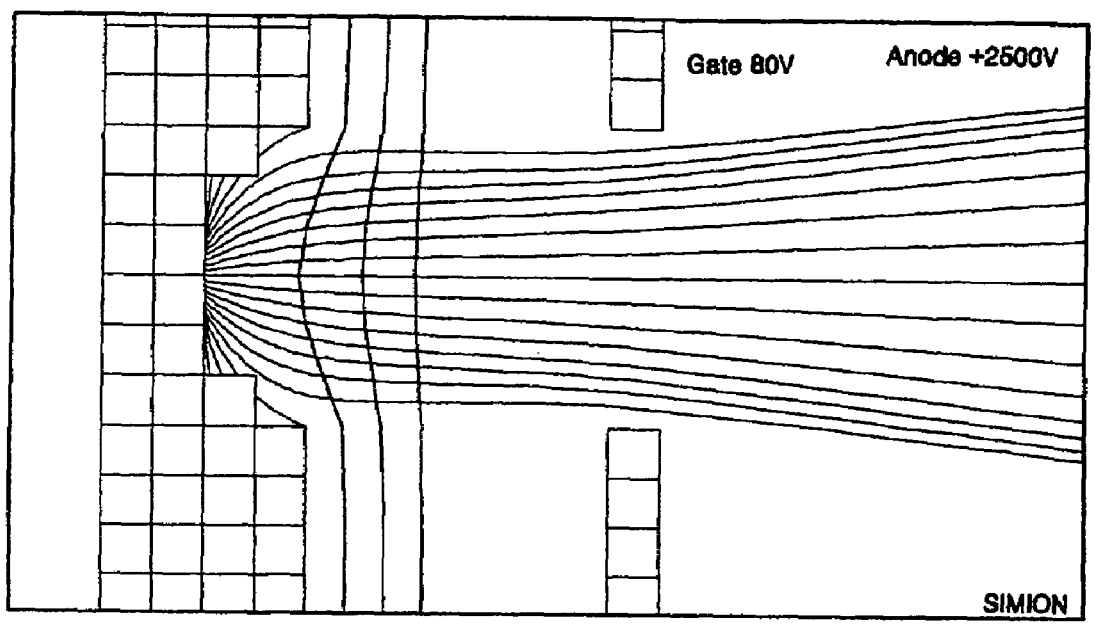
FIG. 5 is a simulation of the trajectories of electron beams emitted from electron emitters in the field emission device of FIG. 4.

Turning now to FIG. 5. FIG. 5 is a simulation of the trajectories of electron beams emitted from electron emitters 150 in the field emission device 100 of FIG. 4. Referring to FIG. 5, the electron beams are focused before they escape from the gate electrode 130.

Figure 6:
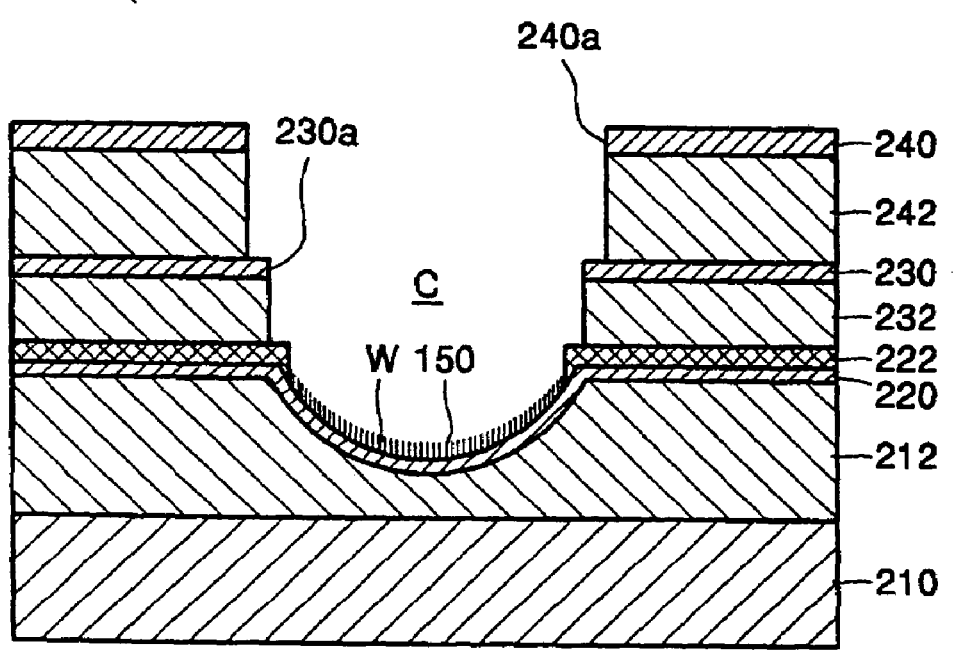
FIG. 6 is a schematic cross-sectional view illustrating a field emission device according to second embodiment of the present invention.

Turning now to FIG. 6, FIG. 6 is a schematic cross-sectional view illustrating a field emission device 200 according to a second embodiment of the present invention. Referring to FIG. 6, an insulating layer 212 having a concave portion W and a cathode electrode 220 are sequentially formed on a glass substrate 210.

The insulating layer 212, such as a silicon oxide layer, is formed to generate the concave portion W for the cathode electrode 220. Alternatively, the cathode electrode 220 having a concave portion can be directly formed on the glass substrate 210, without using the insulating layer 212. The insulating layer 212 can have a thickness of 2 to 10 μm.

The cathode electrode 220 can be an ITO (indium tin oxide) transparent electrode. An amorphous silicon layer 222 is formed on portions of the cathode electrode 220 outside of the concave portion W of cathode electrode 220. The amorphous silicon layer 222 ensures a uniform current flow through the cathode electrode 220. In addition, the amorphous silicon layer 222 has the specific optical properties that allow visible light to pass, but blocks UV light. The amorphous silicon layer 222 functions as a photolighographic mask in a back exposure to UV light, as described below. CNT (carbon nano tube) emitters 250 as electron emitters are formed on the concave portion W of cathode electrode 220.

A lower gate insulating layer (or gate insulating layer) 232, a lower gate electrode (or gate electrode) 230, a focusing gate insulating layer 242, and a focusing gate electrode 240 are sequentially layered on the amorphous silicon layer 222. The lower gate insulating layer 232 and the focusing gate insulating layer 242 have a cavity C. The lower gate electrode 230 has a lower gate aperture 230a corresponding to the cavity C. The focusing gate electrode 240 has a focusing gate aperture 240a corresponding to the cavity C.

The lower gate insulating layer 232 is a layer for maintaining electrical insulation between the lower gate electrode 230 and the cathode electrode 220. The lower gate insulating layer 232 is made of an insulating material, such as silicon oxide ($SiO_2$), and generally has a thickness of at least 1 μm.

The lower gate electrode 230 can be made of chromium with a thickness of about 0.25 μm. The lower gate electrode 230 extracts electron beams from the CNT emitters 250. A predetermined gate voltage, for example 80 V, can be applied to the lower gate electrode 230.

The focusing gate insulating layer 242 is a layer for insulating the lower gate electrode 230 from the focusing gate electrode 240. The focusing gate electrode 240 can be made of a silicon oxide ($SiO_2$) with a thickness of at least 1 μm.

The focusing gate electrode 240 can be made of chromium with a thickness of about 0.25 μm. The focusing gate electrode 240 is supplied with a voltage lower than that of the lower gate electrode 230, and serves to focus the electron beams emitted from the CNT emitters 250.

Figure 7:
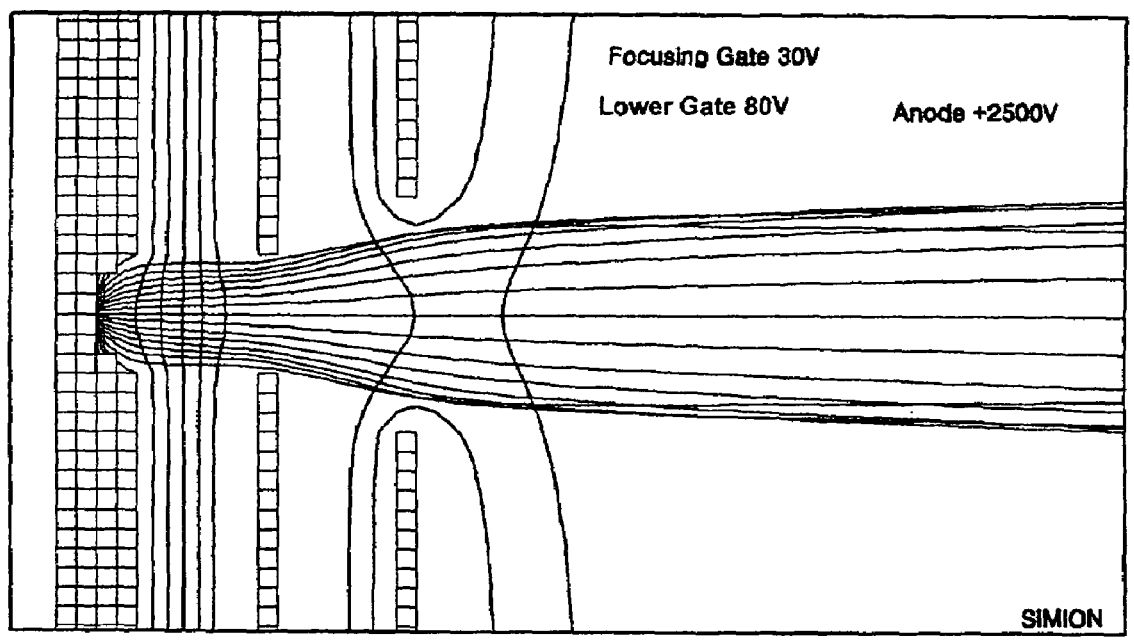
FIG. 7 is a simulation of the trajectories of electron beams emitted from electron emitters in the field emission device of FIG. 6.

FIG. 7 is a simulation of the trajectories of electron beams emitted from electron emitters of the field emission device of FIG. 6. Referring to FIG. 7, the electron beams are focused before they pass through the lower gate electrode 230 and again focused while escaping from the focusing gate electrode 240.

Figure 8:
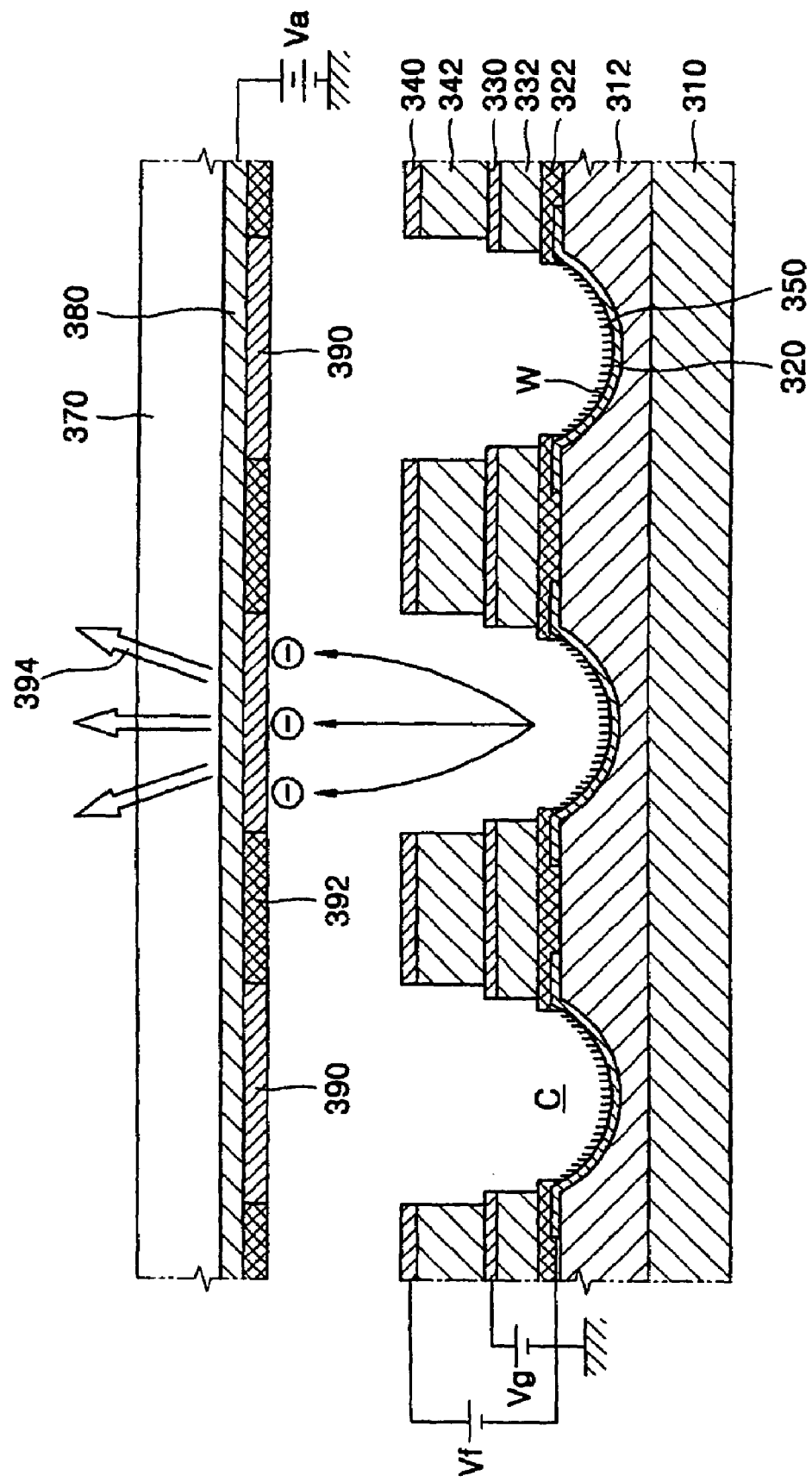
FIG. 8 is a schematic cross-sectional view illustrating the structure of a field emission display employing a novel field emission device according to the present invention.

FIG. 8 is a schematic cross-sectional view illustrating the structure of a field emission display (FED) employing a novel field emission device according to the present invention. Some constituent elements that are substantially identical to those illustrated in FIG. 6 are referred to by the same name and will not be described again in detail.

Referring to FIG. 8, the FED includes a front substrate 370 and a rear substrate 310 spaced apart from each other by a predetermined distance. A spacer (not shown) is provided between the front substrate 370 and the rear substrate 310 to fix the distance between the front substrate 370 and the rear substrate 310. The front substrate 370 and the rear substrate 310 can be made of glass.

A field emitting portion is formed on the rear substrate 310, and a light emitting portion is formed on the front substrate 370. The electrons emitted from the field emitting portion cause light to be emitted from the light emitting portion.

Specifically, an insulating layer 312 having a concave portion W is formed on the rear substrate 310. A plurality of cathode electrodes 320 are formed on the concave portions W of the insulating layer 312 and are arranged in parallel to each other and spaced apart from each other by a predetermined spacing and in a predetermined pattern, for example, in the form of stripes. As the cathode electrodes 320 also have concave portions W that correspond to the concave portions W in insulating layer 312

An amorphous silicon layer 322 is formed on the insulating layer 312 and is perforated by a aperture exposing the concave portion W of the cathode electrode 320. A lower gate insulating layer 332, a lower gate electrode 330, a focusing gate insulating layer 342, and a focusing gate electrode 340 are sequentially formed on the amorphous silicon layer 322, each also being perforated by a aperture and forming a predetermined cavity C above the concave portion W. Electron emitters, for example, CNT emitters 350, are formed on concave portion W of cathode electrode 320.

An anode electrode 380 is formed on the front substrate 370, and a fluorescent layer 390 is coated on the anode electrode 380. A black matrix 392, for increasing color purity, is located on the anode electrode 380 between the fluorescent layers 390.

Now, the operation of a FED having the above structure will be described in detail with reference to the attached drawings. An anode voltage Va, of 2.5 kV pulses, is applied to the anode electrode 380, a gate voltage Vg of 80 V is applied to the lower gate electrode 330, and a focusing gate voltage Vf of 30 V is applied to the focusing gate electrode 340. At this time, electrons are emitted from the CNT emitters 350 due to the gate voltage Vg. The emitted electrons are focused before escaping the lower gate electrode 330, due to the concave shape of the cathode electrode 320, and are again focused due to the focusing gate voltage Vf of focusing gate electrode 340. Because the electrons are properly focused, the focused electrons excite the fluorescent layer 390 at the desired location. Thus, the fluorescent layer 390 emits a predetermined visible light 394.

Figure 9:
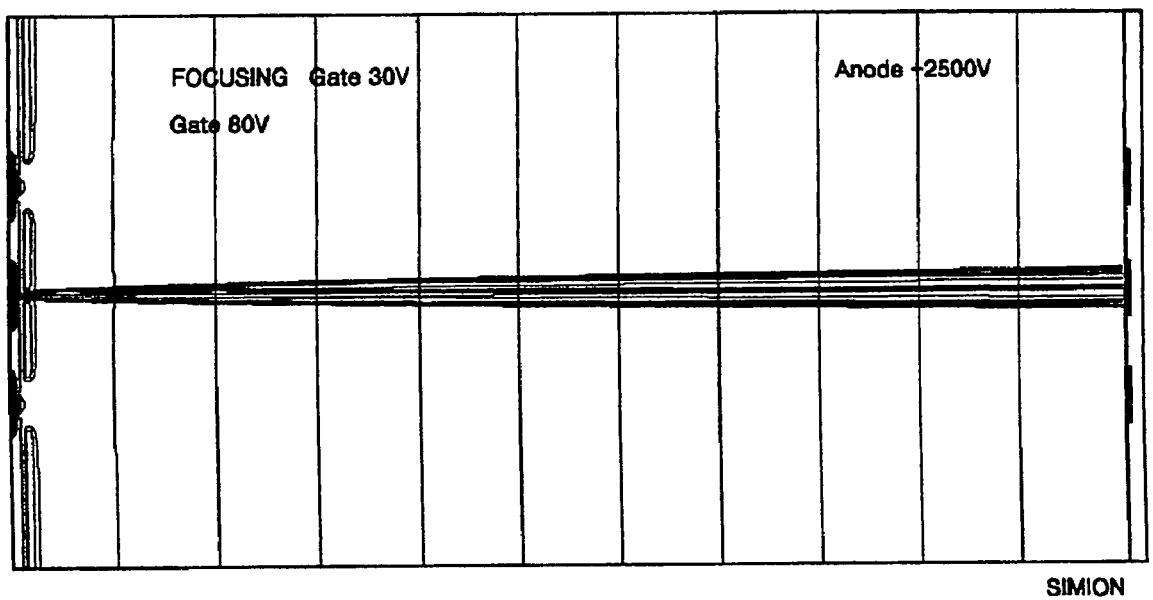
FIG. 9 is a simulation of the trajectories of electron beams emitted from electron emitters in the field emission display of FIG. 8.

Turning now to FIG. 9, FIG. 9 is a simulation of the trajectories of electron beams emitted from electron emitters 350 in the FED 300 illustrated in FIG. 8. Referring to FIG. 9, it can be seen that the electron beams emitted from the FED 300 are focused on the desired pixel on the anode electrode 380. Thus, the FED 300 using a field emission device according to the present invention can provide improved color purity.

Figure 10:
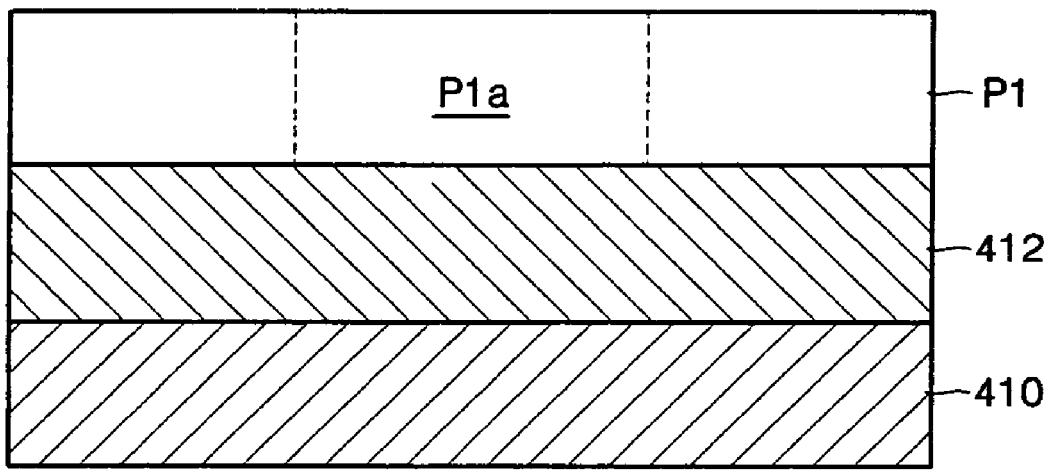
FIGS. 10 through 22 are cross-sectional views illustrating a process of producing the novel field emission device illustrated in FIG. 6 according to an embodiment of the present invention.

Next, the process of producing the novel field emission device 200 of FIG. 6 according to an embodiment of the present invention will be described in detail with reference to FIGS. 10 through 22. Turning now to FIG. 10, a silicon oxide layer is formed to a thickness of at least 1 µm to become insulating layer 412 on a glass substrate 410 using PECVD (plasma enhanced chemical vapor deposition). Then, a first photoresist film P1 is coated on the insulating layer 412, and the first photoresist film P1 is exposed to UV light. Front exposure or back exposure can be performed by using a separate mask (not shown). UV light enters a portion corresponding to the concave portion W as illustrated in FIG. 6 of the first photoresist film P1. That is, only a region P1a located on the top of the concave portion W of the first photoresist film P1 is exposed to UV light. The exposed region P1a is removed via a developing operation. Then, baking is performed to harden the patterned photoresist layer P1.

Figure 11:
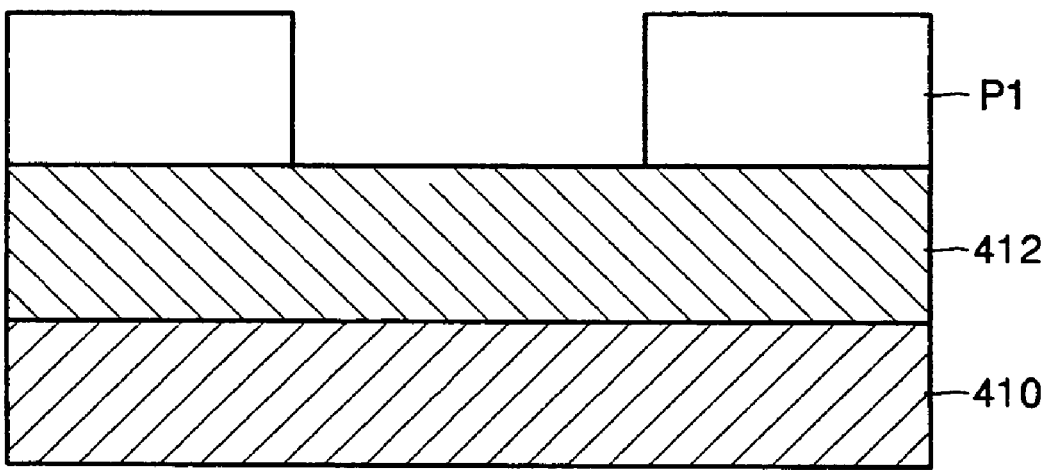
Figure 12:
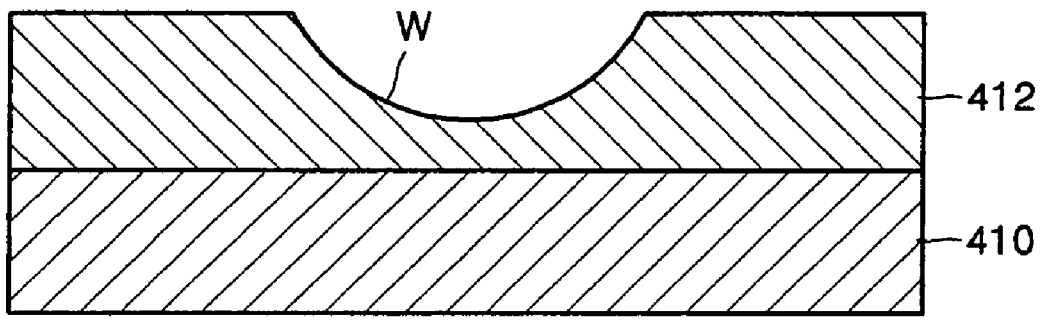

Turning now to FIG. 11, FIG. 11 illustrates the product of the above developing and baking operations. The insulating layer 412 is exposed at the removed region P1a. Turning now to FIG. 12, a wet etching of the insulating layer 412 is performed using the patterned first photoresist film P1 as an etch mask. This wet etch forms hemispherical concave portion W or well. Then, the first patterned photoresist film P1 is removed. The location of the concave portion W corresponds to that of the CNT emitters (150 as illustrated in FIG. 6). The concave portion W has a diameter of at least 3 µm.

Figure 13:
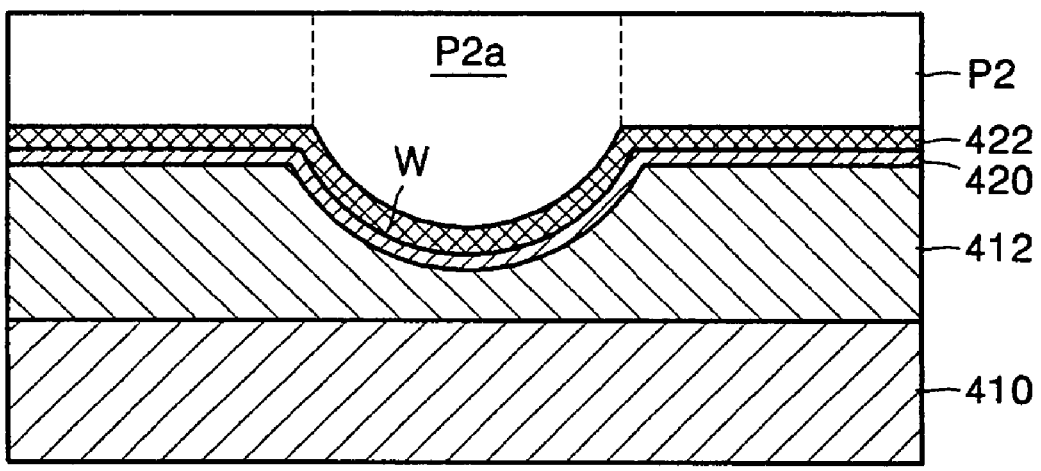
Figure 14:
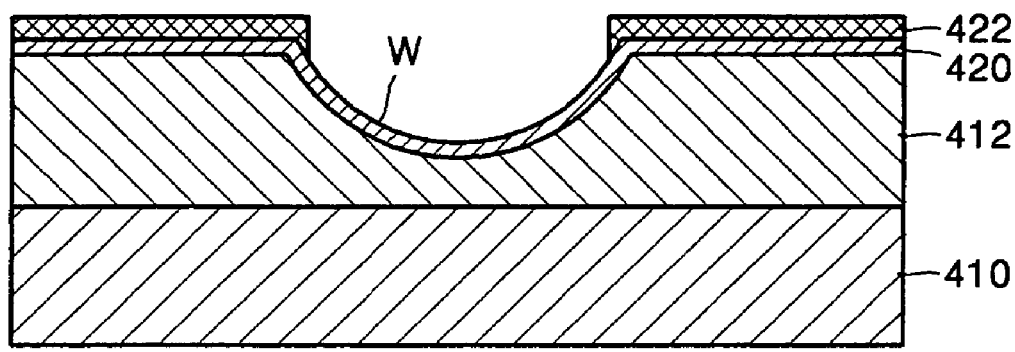

Turning now to FIG. 13, a cathode electrode 420 of preferably transparent ITO is formed on the insulating layer 412 by sputtering. Then, an amorphous silicon layer 422 is formed on the cathode electrode 420 using PECVD. Then, a second photoresist film P2 is coated on the amorphous silicon layer 422, and region P2a corresponding to the concave portion W is exposed to light and developed. A portion of the amorphous silicon layer 422 is exposed through removed region P2a. Wet etching is performed on the open portion of the amorphous silicon layer 422 using the second photoresist film P2 as an etch mask. FIG. 14 illustrates the result of the wet etching and after the second photoresist film P2 is removed.

Figure 15:
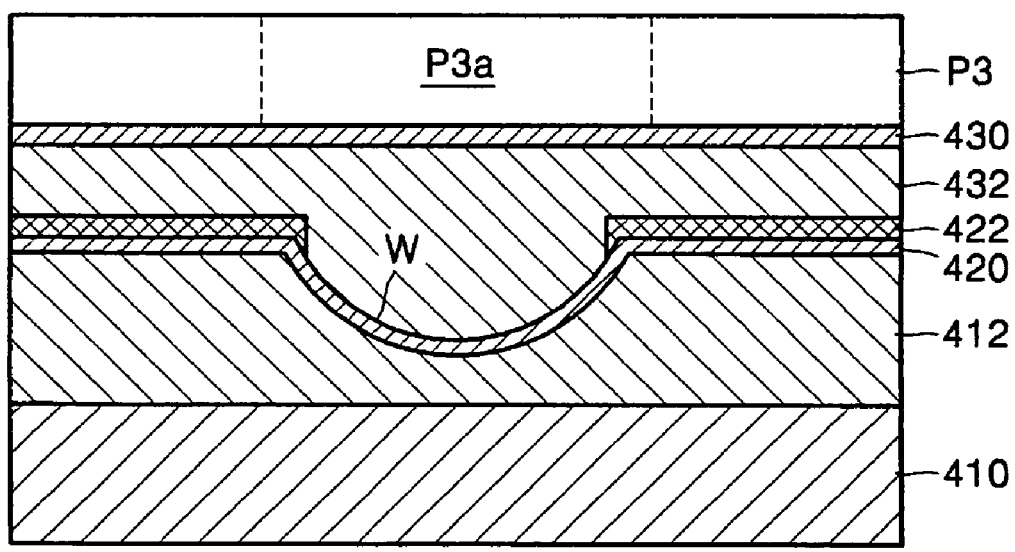

Referring now to FIG. 15, after removal of the second photoresist film P2, a lower gate insulating layer 432 is formed on the amorphous silicon layer 422 filling the concave portion W. The lower gate insulating layer 432 is made of a silicon oxide having a thickness of at least 1 µm. Then, a lower gate electrode 430 is formed on the lower gate insulating layer 432. The lower gate electrode 430 is made of chromium and is applied by sputtering, to a thickness of about 0.25 µm. Next, a third photoresist film P3 is formed over the lower gate electrode 430, and region P3a corresponding to the concave portion W is exposed to light.

Subsequently, the exposed region P3a is removed by developing. A portion of the lower gate electrode 430 is exposed via the removed region P3a. Wet etching is performed on the exposed portion of the lower gate electrode 430 using the patterned third photoresist film P3 as an etch mask.

Figure 16:
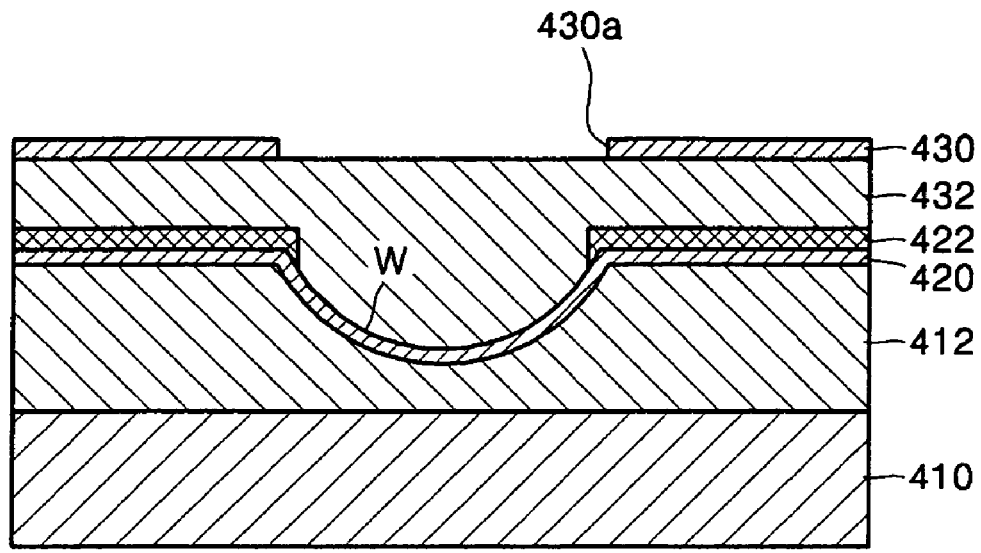

Turning now to FIG. 16, FIG. 16 illustrates the resultant product after the wet etching of the exposed portion the lower gate electrode 430 and after the removal of third photoresist film P3. FIG. 16 illustrates a lower gate aperture 430a formed in lower gate electrode 430.

Figure 17:
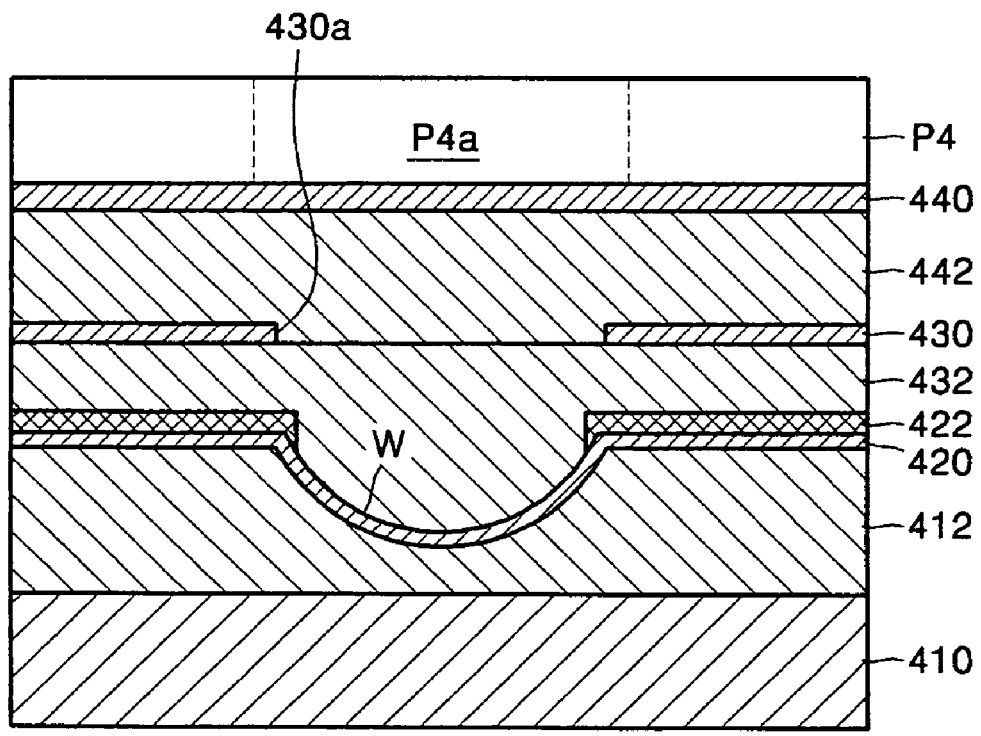

Referring now to FIG. 17, after removal of the third photoresist film P3, a focusing gate insulating layer 442 is formed on the lower gate insulating layer 432 filling the lower gate aperture 430a and over the lower gate electrode 430. The focusing gate insulating layer 442 is composed of a silicon oxide having a thickness of at least 1 µm. Then, a focusing gate electrode 440 is formed on top of the focusing gate insulating layer 442. The focusing gate electrode 440 is made of chromium and is applied by sputtering and has a thickness of about 0.25 µm. Next, a fourth photoresist film P4 is formed on the focusing gate electrode 440 and region P4a corresponding to the concave portion W is exposed to light.

Subsequently, the exposed region P4a is removed by developing. A portion of the focusing gate electrode 440 is exposed via the removed region P4a. Wet etching is performed on the open portion of the focusing gate electrode 440 using the fourth photoresist film P4 as an etch mask.

Figure 18:
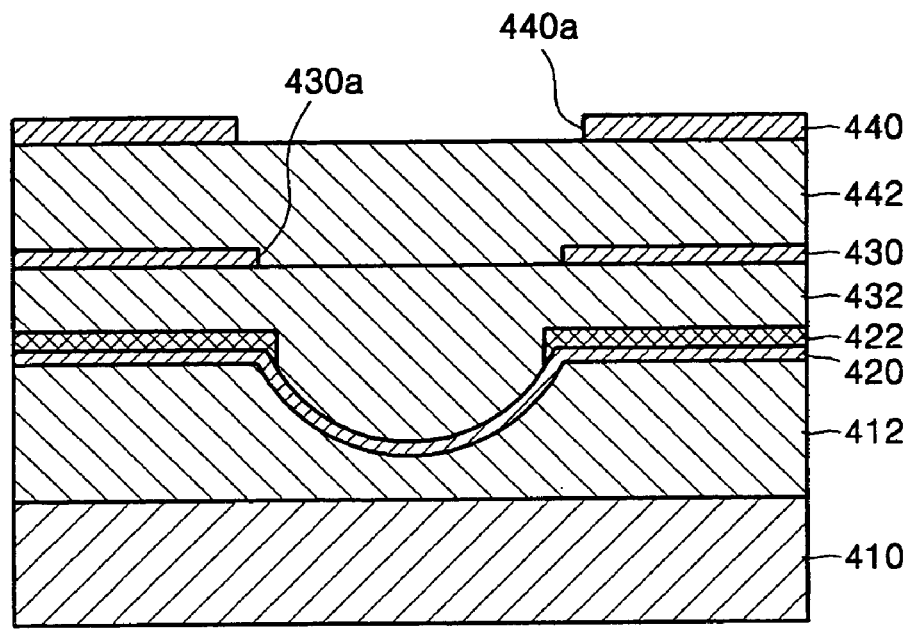
Figure 19:
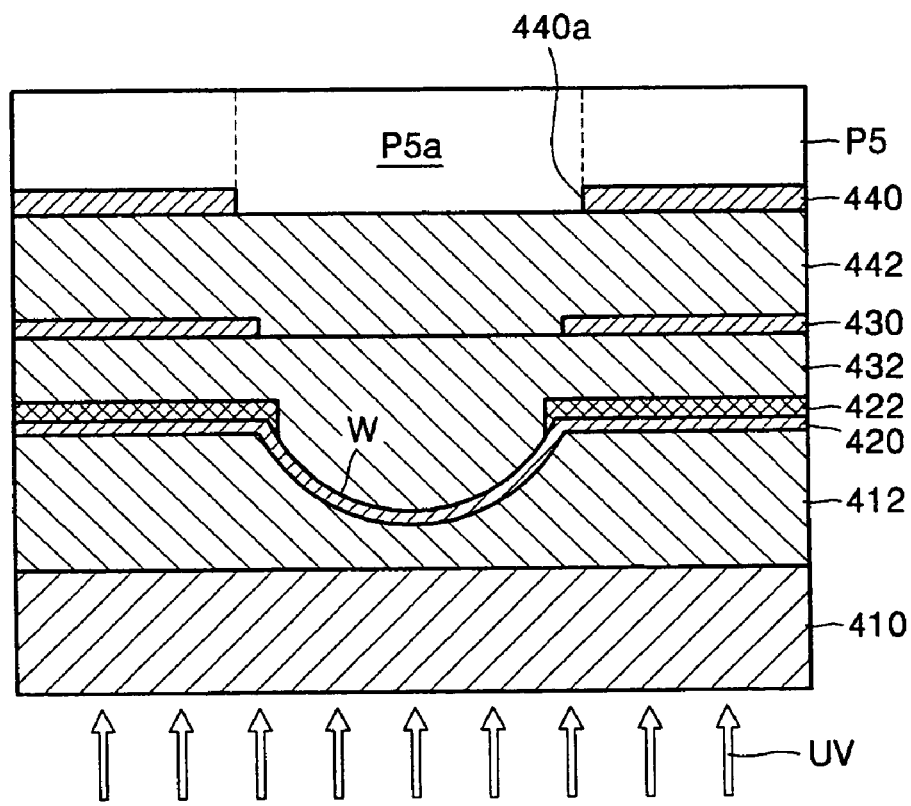

Turning now to FIG. 18, FIG. 18 illustrates the result, with the fourth photoresist film P4 removed after wet etching the exposed portion of the focusing gate electrode 440. A focusing gate aperture 440a is formed. Referring to FIG. 19, after removal of the fourth photoresist film P4, a fifth photoresist film P5 is coated on the patterned focusing gate electrode 440. Then, region P5a corresponding to the concave portion W and focusing gate aperture 440a is exposed to light. At this time, back exposure can be performed by irradiating UV light toward the substrate 410 from below. Since the amorphous silicon layer 422 blocks UV light, only region P5a corresponding to the concave portion W of the fifth photoresist film P5 is exposed to the UV light. Thus, amorphous silicon layer 422 serves as a photolithography mask.

Figure 20:
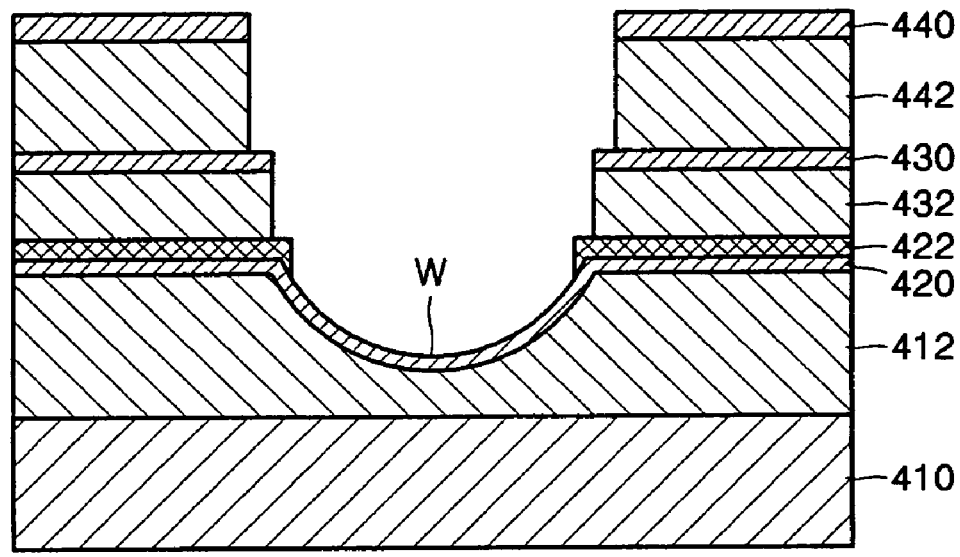

After exposure, the exposed region P5a is removed by developing. Wet etching is performed on the focusing gate insulating layer 442 and the lower gate insulating layer 432 using the fifth photoresist film P5 as an etching mask, to open the concave portion W to expose the cathode electrode 420. FIG. 20 illustrates the result after the wet etching and after the removal of the fifth photoresist film P5.

Figure 21:
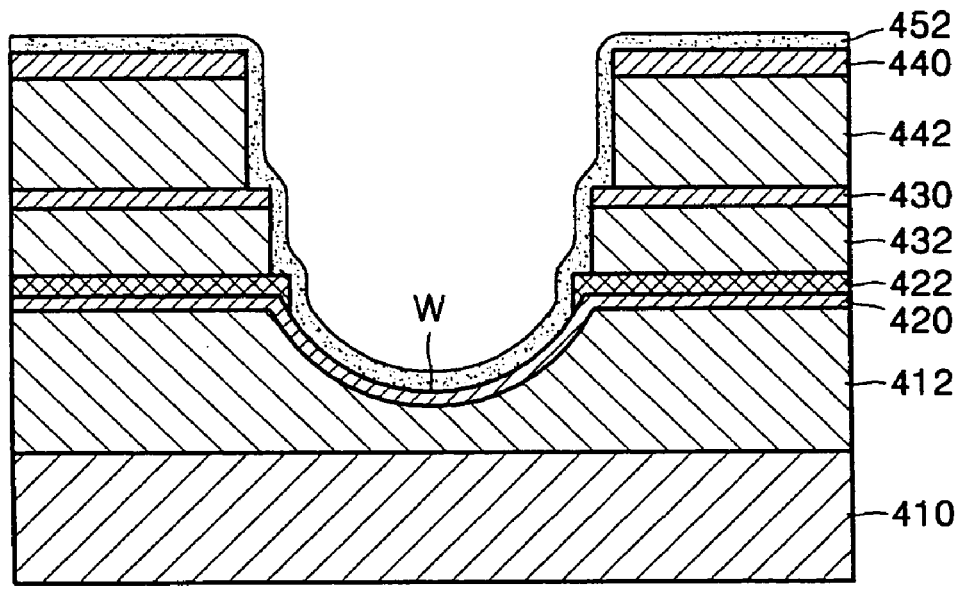
Figure 22:
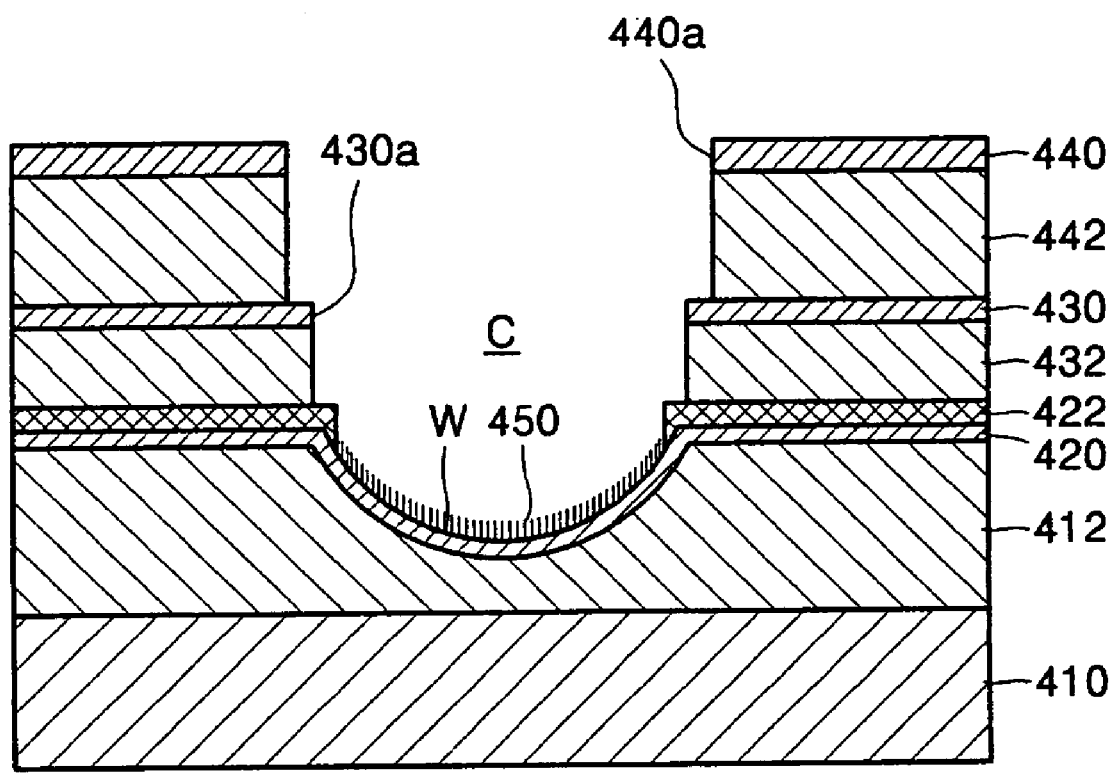

Referring now to FIG. 21, a CNT paste 452 containing a negative photosensitive substance is coated on the exposed concave portion W of cathode electrode 420. Then a back exposure is performed on the photosensitive CNT paste 452 using the amorphous silicon layer 422 as a photolithography mask. Then, CNT emitters 450 are formed on the concave cathode electrode 420 by developing and baking operations, to result in the structure illustrated in FIG. 22.

The above process of producing the field emission device produces the field emission device 200 illustrated in FIG. 6. The field emission device 100 illustrated in FIG. 4 can be produced by an equivalent process, but by omitting the forming of the focusing gate insulating layer and the focusing gate electrode.

In the embodiments of the present invention, the CNT emitters are formed using a printing method, but the present invention is in no way so limited. For example, the CNT can be grown by forming a catalytic metal layer on the concave portion W of the cathode electrode 420 and then depositing a carbon containing gas, such as methane gas on to the catalytic metal layer. The forming of the insulating layer 412 and the forming of the cathode electrode 420 can instead be performed by forming the concave portion W directly on the cathode electrode 420, instead of on the insulating layer 412.

As described above, in the field emission devices according to the present invention, the cathode electrode has a concave portion and CNT emitters are formed on the concave portion, thus increasing the efficiency of focusing electrons emitted from the CNT emitters. Thus, the resulting FED employing the novel field emission device can provide improved color purity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A field emission device, comprising:
   a glass substrate;
   an insulating layer arranged on the glass substrate and having a concave portion;
   a cathode electrode arranged on the insulating layer, the cathode electrode having a concave portion;
   a plurality of electron emitters arranged on the concave portion of the cathode electrode;
   a gate insulating layer arranged on the cathode electrode and having a cavity communicating with the concave portion of the cathode electrode; and
   a gate electrode arranged on the gate insulating layer and having a gate aperture aligned with the cavity.

2. The field emission device of claim 1, the cavity being of a hemispherical shape.

3. The field emission device of claim 1, further comprising an amorphous silicon layer arranged between the cathode electrode and the gate insulating layer, the amorphous silicon layer being perforated by a aperture that is aligned with the concave portion of the cathode electrode.

4. The field emission device of claim 1, the plurality of electron emitters comprises carbon nanotube (CNT) emitters.

5. A field emission device, comprising:
   a glass substrate;
   an insulating layer arranged on the glass substrate and having a concave portion;
   a cathode electrode arranged on the insulating layer, the cathode electrode having a concave portion;
   a plurality of electron emitters arranged on the concave portion of the cathode electrode;
   a lower gate insulating layer arranged on the cathode electrode and having a cavity communicating with the concave portion of the cathode electrode;
   a lower gate electrode arranged on the lower gate insulating layer and having a lower gate aperture aligned with the cavity;
   a focusing gate insulating layer arranged on the lower gate electrode and having an aperture communicating with the cavity; and
   a focusing gate electrode arranged on the focusing gate insulating layer and having a focusing gate aperture aligned with the cavity.

6. The field emission device of claim 5, the cavity having a shape of a hemisphere.

7. The field emission device of claim 5, further comprising an amorphous silicon layer arranged between the cathode electrode and the lower gate insulating layer and having an aperture aligned with the concave portion of the cathode electrode.

8. The field emission device of claim 5, the plurality of electron emitters comprises carbon nanotube (CNT) emitters.

9. A field emission display (FED), comprising:
   a rear substrate;
   an insulating layer arranged on the rear substrate and having a concave portion;
   a cathode electrode arranged on the insulating layer, the cathode electrode having a concave portion;
   a plurality of electron emitters arranged on the concave portion of the cathode electrode;
   a gate insulating layer arranged on the cathode electrode and having a cavity communicating with the concave portion of the cathode electrode;
   a gate electrode arranged on the gate insulating layer and having a gate aperture aligned with the cavity;
   a front substrate spaced apart from the substrate by predetermined distance;
   an anode electrode arranged on a side of the front substrate facing a plurality of electron emitters; and
   a fluorescent layer arranged on the anode electrode.

10. The FED of claim 9, the cavity having a shape of a hemisphere.

11. The FED of claim 9, further comprising an amorphous silicon layer arranged between the cathode electrode and the gate insulating layer, the amorphous silicon layer having an aperture corresponding to the concave portion of the cathode electrode.

12. The FED of claim 9, the plurality of electron emitters comprises carbon nanotube (CNT) emitters.

13. A field emission display (FED), comprising:
   a rear substrate;
   an insulating layer arranged on the rear substrate and having a concave portion;
   a cathode electrode arranged on the insulating layer, the cathode electrode having a concave portion;
   a plurality of electron emitters arranged on the concave portion of the cathode electrode;
   a lower gate insulating layer arranged on the cathode electrode and having a cavity communicating with the concave portion of the cathode electrode;
   a lower gate electrode arranged on the lower gate insulating layer and having a lower gate aperture aligned with the cavity;
   a focusing gate insulating layer arranged on the lower gate electrode and having an aperture communicating with the cavity;
   a focusing gate electrode arranged on the focusing gate insulating layer and having a focusing gate aperture aligned with the cavity;
   a front substrate spaced apart from the rear substrate by predetermined distance;
   an anode electrode arranged on a side of the front substrate facing the plurality of electron emitters; and
   a fluorescent layer arranged on the anode electrode and facing the plurality of electron emitters.

14. The FED of claim 13, the cavity having a shape of a hemisphere.

15. The FED of claim 13, further comprising an amorphous silicon layer arranged between the cathode electrode and the lower gate insulating layer, the amorphous silicon layer having an aperture corresponding to the concave portion of the cathode electrode.

16. The FED of claim 13, the plurality of electron emitters comprises carbon nanotube (CNT) emitters.

* * * * *